(12) United States Patent
Boer et al.

(10) Patent No.: US 9,032,623 B2
(45) Date of Patent: May 19, 2015

(54) METHOD OF MANUFACTURING A BURNER FRONT FACE

(75) Inventors: Anne Boer, Amsterdam (NL); Henricus Gijsbertus Van Schie, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1378 days.

(21) Appl. No.: 12/672,173

(22) PCT Filed: Aug. 5, 2008

(86) PCT No.: PCT/EP2008/060277
§ 371 (c)(1),
(2), (4) Date: Jan. 11, 2012

(87) PCT Pub. No.: WO2009/019271
PCT Pub. Date: Feb. 12, 2009

(65) Prior Publication Data
US 2012/0222592 A1 Sep. 6, 2012

Related U.S. Application Data

(60) Provisional application No. 60/954,342, filed on Aug. 7, 2007.

(30) Foreign Application Priority Data

Aug. 6, 2007 (EP) .................................... 07113847

(51) Int. Cl.
*F23D 1/00* (2006.01)
*C01B 3/36* (2006.01)
(Continued)

(52) U.S. Cl.
CPC .............. *F23D 1/00* (2013.01); *Y10T 29/49348* (2015.01); *C01B 3/363* (2013.01);
(Continued)

(58) Field of Classification Search
CPC ............ F23D 2203/1012; F23D 14/16; F23D 2900/14001; F23D 11/08; F23D 11/36; F23D 14/22; F23D 14/78; F23D 1/00; F23D 2213/00; F23D 2214/00; F24C 3/042; F24C 3/062; F24C 15/08; F24C 15/16; F24C 5/02; F28F 9/18; B23K 1/0053; Y10T 29/49348
USPC ........................................................ 110/263
See application file for complete search history.

(56) References Cited

U.S. PATENT DOCUMENTS

| 259,048 A | 6/1882 | Richardson |
| 1,995,122 A | 3/1935 | Fred |

(Continued)

FOREIGN PATENT DOCUMENTS

| CN | 2129878 | 4/1993 |
| CN | 2506879 | 8/2002 |

(Continued)

OTHER PUBLICATIONS

Special Metals, Inconel alloy 718, Publication No. SMC-045, Sep. 2004. http://web.archive.org/web/20060322125252/http://www.specialmetals.com/documents/Inconel%20alloy%20718.pdf.*

(Continued)

*Primary Examiner* — David Bryant
*Assistant Examiner* — Ruth G Hidalgo-Hernande

(57) ABSTRACT

The invention relates to a method of manufacturing a front face (21) for a burner (1), particularly for the gasification of solid carbonaceous materials by partial combustion. The front face (21) comprises a central aperture (23) corresponding to the discharge end of the burner, a front side wall (24) and a backside wall (25) spaced by one or more baffles (26) defining a coolant flow path with a coolant inlet (30) and a coolant outlet (31). The front side wall (24) and the one or more baffles (26) are made of a single piece of metal and the backside wall (25) is welded on the free top ends of the one or more baffles. The front face can for example be made of a steel according to UNS N07718.

12 Claims, 2 Drawing Sheets

(51) Int. Cl.
*C10J 3/50* (2006.01)
*F23D 11/36* (2006.01)
*F23D 14/22* (2006.01)
*F23D 14/78* (2006.01)

(52) U.S. Cl.
CPC ........ *C01B 2203/0255* (2013.01); *C10J 3/506* (2013.01); *C10J 2200/09* (2013.01); *C10J 2200/152* (2013.01); *F23D 11/36* (2013.01); *F23D 14/22* (2013.01); *F23D 14/78* (2013.01); *F23D 2213/00* (2013.01); *F23D 2214/00* (2013.01)

(56) References Cited

U.S. PATENT DOCUMENTS

| | | |
|---|---|---|
| 2,759,491 A | 8/1956 | Everhart |
| 3,101,384 A | 8/1963 | Paul |
| 3,121,457 A | 2/1964 | Whipple et al. |
| 3,175,817 A | 3/1965 | Smith et al. |
| 3,202,201 A | 8/1965 | Maselia et al. |
| 3,255,966 A | 6/1966 | Hoffert et al. |
| 3,322,419 A | 5/1967 | Smith et al. |
| 3,347,660 A | 10/1967 | Smith et al. |
| 3,533,558 A | 10/1970 | Masters |
| 3,567,202 A | 3/1971 | Mercatoris et al. |
| 3,586,240 A | 6/1971 | Konioka et al. |
| 3,662,447 A | 5/1972 | Schweng et al. |
| 3,697,058 A | 10/1972 | Chaikin et al. |
| 3,856,457 A | 12/1974 | Miller |
| 3,901,445 A | 8/1975 | Chang |
| 3,972,515 A | 8/1976 | Mercatoris |
| 4,121,858 A | 10/1978 | Schulz |
| 4,171,091 A | 10/1979 | Van Hardeveld et al. |
| 4,216,908 A | 8/1980 | Sakurai et al. |
| 4,284,242 A * | 8/1981 | Randell ........ 239/422 |
| 4,303,386 A | 12/1981 | Voorheis et al. |
| 4,361,285 A | 11/1982 | Koppehele et al. |
| 4,363,443 A | 12/1982 | Huehne |
| 4,510,874 A | 4/1985 | Hasenack |
| 4,523,529 A | 6/1985 | Poll |
| 4,538,530 A | 9/1985 | Whitman |
| 4,592,506 A | 6/1986 | Capes et al. |
| 4,666,397 A | 5/1987 | Wenning et al. |
| 4,858,538 A * | 8/1989 | Kuypers et al. ........ 110/264 |
| 4,865,542 A * | 9/1989 | Hasenack et al. ........ 431/160 |
| 4,887,962 A * | 12/1989 | Hasenack et al. ........ 110/263 |
| 5,064,135 A | 11/1991 | Williamson et al. |
| 5,088,774 A | 2/1992 | Spiegelman |
| 5,127,346 A | 7/1992 | Kepplinger et al. |
| 5,141,261 A | 8/1992 | Ziu |
| 5,307,996 A | 5/1994 | Kataoka et al. |
| 5,401,064 A | 3/1995 | Guest |
| 5,511,725 A | 4/1996 | Barker et al. |
| 5,513,801 A | 5/1996 | Huhne et al. |
| 5,615,833 A | 4/1997 | Robillard et al. |
| 5,834,066 A | 11/1998 | Kunzli et al. |
| 5,947,716 A | 9/1999 | Bellamy et al. |
| 5,954,491 A | 9/1999 | Helton et al. |
| 6,010,330 A | 1/2000 | Helton et al. |
| 6,234,406 B1 | 5/2001 | Thomas |
| 6,267,301 B1 | 7/2001 | Haruch |
| 6,284,324 B1 | 9/2001 | Whittaker |
| 6,478,239 B2 | 11/2002 | Chung et al. |
| 6,691,928 B2 | 2/2004 | Chung et al. |
| 6,755,355 B2 | 6/2004 | Whittaker |
| 6,892,654 B2 | 5/2005 | Whittaker et al. |
| 6,923,385 B2 | 8/2005 | Koponen |
| 7,226,089 B2 | 6/2007 | Wilkinson, III |
| 7,258,831 B2 | 8/2007 | Vecchiet et al. |
| 7,392,668 B2 | 7/2008 | Adams et al. |
| 7,506,822 B2 | 3/2009 | Cairo et al. |
| 7,566,080 B2 | 7/2009 | Howard |
| 7,674,449 B2 | 3/2010 | Randolph, III et al. |
| 7,845,688 B2 | 12/2010 | Gallagher et al. |
| 7,993,131 B2 | 8/2011 | Douglas |
| 8,074,687 B2 | 12/2011 | Queau et al. |
| 2001/0030247 A1 | 10/2001 | Chung et al. |
| 2002/0125337 A1 | 9/2002 | Chung et al. |
| 2003/0056439 A1 | 3/2003 | Wilhelm et al. ........ 48/127.9 |
| 2003/0100913 A1 | 5/2003 | Shi |
| 2003/0196576 A1 * | 10/2003 | Whittaker et al. ........ 110/260 |
| 2004/0067461 A1 * | 4/2004 | Ranke et al. ........ 431/9 |
| 2005/0194073 A1 | 9/2005 | Hammano et al. |
| 2006/0061102 A1 | 3/2006 | Wilkinson |
| 2006/0231645 A1 | 10/2006 | Chan |
| 2009/0049747 A1 | 2/2009 | Schilder et al. |
| 2009/0226362 A1 | 9/2009 | Chan et al. |

FOREIGN PATENT DOCUMENTS

| | | | |
|---|---|---|---|
| CN | 1662633 A | 8/2005 | |
| CN | 1916493 | 2/2007 | |
| CN | 1916493 A * | 2/2007 | |
| CN | 201203307 Y | 3/2009 | |
| CN | 201228965 | 4/2009 | |
| CN | 201228965 Y | 4/2009 | |
| CN | 201233007 | 5/2009 | |
| DE | 19729089 | 1/1999 | ........ F23D 11/40 |
| EP | 108427 | 5/1984 | ........ F23D 1/00 |
| EP | 0127273 A2 | 12/1984 | |
| EP | 0130630 A2 * | 1/1985 | |
| EP | 0268432 A2 | 5/1988 | |
| EP | 268432 A2 | 5/1988 | |
| EP | 328794 | 8/1989 | ........ C10J 3/48 |
| EP | 437698 | 7/1991 | ........ C10J 3/46 |
| EP | 0582521 A1 | 2/1994 | |
| EP | 652276 | 5/1995 | ........ C10J 3/48 |
| EP | 1577414 A2 | 9/2005 | |
| GB | 1027041 | 4/1966 | |
| GB | 1135411 | 12/1968 | |
| GB | 1135411 A | 12/1968 | |
| GB | 1229802 | 4/1971 | |
| GB | 1229802 A | 4/1971 | |
| GB | 2151348 | 7/1985 | ........ F23D 1/00 |
| JP | 02-008603 A | 1/1990 | |
| JP | 02-133524 | 11/1990 | |
| JP | 6017527 | 3/1994 | |
| JP | 6201112 | 7/1994 | |
| JP | 2627552 B2 | 7/1997 | |
| JP | 2004-510938 A | 4/2004 | |
| JP | 2006-274312 | 10/2006 | |
| JP | 2006-274312 A | 10/2006 | |
| WO | 0181825 A1 | 11/2001 | |
| WO | 2005000749 A2 | 1/2005 | |
| WO | 2009019271 A1 | 2/2009 | |

OTHER PUBLICATIONS

JIS Handbook—Steel I issued by Japanese Standards Association on Jan. 31, 2003.

JIS Handbook "Steel I", the Japanese Standards Association, Japan, Jan. 31, 2003.

Deyuan, Zhang; Properties of Precipitation Hardened Stainless Steel, from Heat Treatment to Metals in Foreign Countries, Issue No. 1, pp. 36-37, 1997.

Inconal Alloy 718 Brochure, Special Metals Corporation, www.specialmetals.com, pp. 1-28, 2007.

* cited by examiner

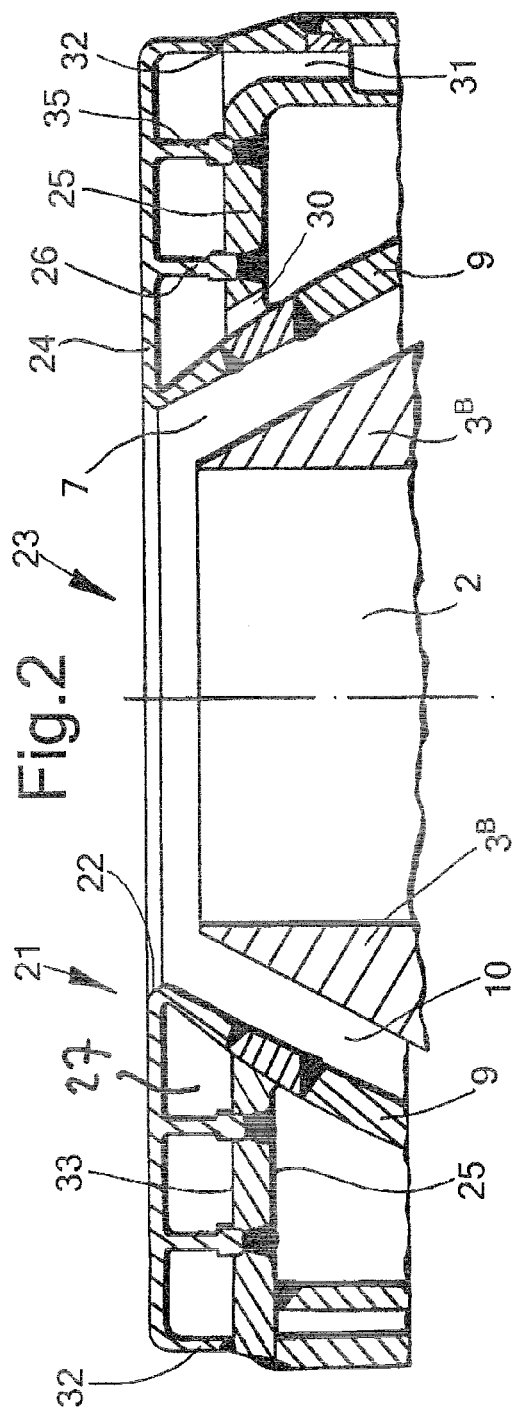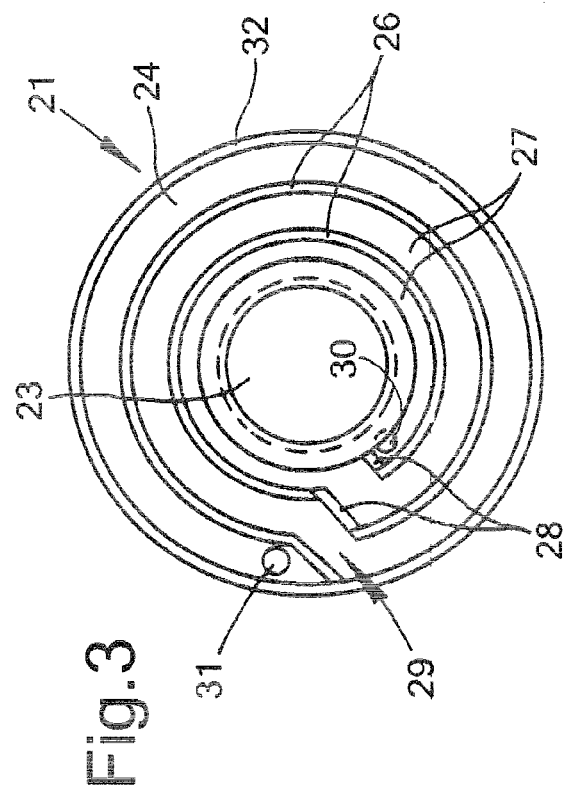

METHOD OF MANUFACTURING A BURNER FRONT FACE

PRIORITY CLAIM

The present application claims priority to European Patent Application 07113847.3 filed 6 Aug. 2007 and U.S. Provisional Patent Application 60/954,342 filed 7 Aug. 2007.

FIELD OF THE INVENTION

The invention relates to a method for manufacturing a front face for protecting the discharge end of a burner with two or more coaxial channels, the front face comprising a central aperture corresponding to the discharge end of the burner, a front side wall and a backside wall spaced by one or more baffles defining a coolant flow path with a first end provided with a coolant inlet and a second end having a coolant discharge outlet.

BACKGROUND OF THE INVENTION

Such a front face is particularly useful for protecting burners used for the partial combustion of carbonaceous fuels, such as finely divided solid fuel carried by a gas, e.g., pulverized coal carried by a carrier gas such as nitrogen gas or carbon dioxide, using an oxygen-containing gas, e.g., for producing pressurized synthesis gas, fuel gas or reducing gas.

Partial combustion, also known as gasification, of a solid carbonaceous fuel is obtained by the reaction of the fuel with oxygen. The fuel contains as combustible components, mainly carbon and hydrogen. The gas-carried finely divided carbonaceous fuel and the oxygen-containing gas are passed via the separate channels in the burner into a reactor at relatively high velocity. In the reactor a flame is maintained in which the fuel reacts with the oxygen in the oxygen-containing gas at temperatures above 1300° C. to form mainly carbon monoxide and hydrogen.

The term "oxygen-containing gas" as used herein is intended to refer to gas containing free oxygen, $O_2$, and to include air, oxygen-enriched air, i.e., more than 21 mole % oxygen, and also substantially pure oxygen, i.e., more than about 95 mole % oxygen, with the remainder comprising gases normally found in air such as nitrogen, and/or rare gases.

The term "solid carbonaceous fuel" as used herein is intended to include various gas carried combustible materials and mixtures thereof from the group of coal, coke from coal, coal liquefaction residues, petroleum coke, soot, biomass, and particulate solids derived from oil shale, tar sands and pitch. The coal may be of any type, including lignite, sub-bituminous, bituminous and anthracite. The solid carbonaceous fuels are preferably ground to a particle size so that at least about 90% by weight of the material is less than 90 microns and moisture content is less than about five percent weight.

U.S. Pat. No. 4,887,962 and U.S. Pat. No. 4,865,542 disclose a burner for such a partial combustion process. The burner comprises a central channel with an outlet for supplying the fuel to the combustions zone, and a coaxial annular channel with an outlet surrounding the central channel's outlet to supply an oxygen containing gas intersecting and mixing with the flow of solid fuel from the outlet of the central channel. The burner further comprises a front face disposed at the discharge end of the burner. The front face has a central aperture through which the fuel and the oxygen containing gas flow to the combustion zone. The front face is a double walled member comprising a central aperture corresponding to the discharge end of the burner, a front side wall and a backside wall spaced by a spiral baffle defining a spiral flow path with a first end operatively connected to a coolant supply conduit and a second end having an outlet operatively connected to a coolant discharge conduit.

At the discharge end, the combustion temperatures can be as high as 1300° C. or higher. This causes thermal stresses and deterioration of the burner during prolonged operation, particularly by fatigue stresses, which may ultimately result in leaks of coolant. Moreover, during operation burner heads also undergo high mechanical pressure loads.

SUMMARY OF THE INVENTION

It is an object of the present invention to provide a method of manufacturing a front face allowing a front face construction which balances optimized heat dissipation with a high mechanical strength.

The object of the invention is achieved by a method for manufacturing a front face for protecting the discharge end of a burner wherein the front side wall and the one or more baffles are machined out of a single piece of metal and wherein the backside wall is welded on the free top end of the one or more baffles by welding the backside wall from its surface opposite the contact surface with the baffle top ends. By making the baffle and the front wall from one single piece, the mechanical strength of the structure can be optimized, allowing the use of thinner walls which improves heat transfer. The front wall of the front face can be made free of welding spots. Suitable machining methods are for instance milling, spark erosion, electrical discharge machining and the like.

The baffle can for example be a single spiral baffle, defining a spiral flow path, as in U.S. Pat. No. 4,887,962. A spiral flow path can also be realized by using a set of three or more concentric baffles defining concentric channel sections at least one of these channel sections being blocked by a partition bridging an inner and an outer baffle just after an interruption in the inner baffle, thus leading the flow path to a next concentric channel section closer to the front face center. The foregoing method creates an approximate spiral flow path. It has been found that a number of two or three concentric flow path sections result in effective heat dissipation with only limited pressure drop. However, the number of concentric sections can also be higher if so desired.

The front face can have a circumferential wall closing off the space between the front and backside walls. The circumferential wall can for example be an extension of the spiral baffle defining the flow path.

A suitable steel type for manufacturing the front wall with the baffles, and optionally also the backside wall, is a steel alloy comprising 45-60 wt. % of nickel, and, optionally, 17-25 wt. % of chromium. Particularly suitable are steel types according to US standard UNS N07718 (German standard W. Nr. 2.4668), such as Inconel® 718 commercially available from Special Metals Corporation, Nicrofer® 5219 of ThyssenKrupp, Allvac® 718 of Allvac, Haynes® 718 of Haynes International, and Altemp® 718 of Allegheny Ludlum. It has been found that such nickel chromium steels not only combine high tensile strength with good corrosion resistance, but also show excellent thermal conductivity. Particularly the chromium content improves the resistance against corrosion and sulfidation.

The steel alloy may for instance comprise 4-6 wt. % of niobium, and/or 2-4 wt. % molybdenum, and/or at least one element of the group of titanium, aluminium, cobalt, carbon, manganese, silicon, phosphorus, sulphur, boron, and copper, in an amount of 0.004-1.3 wt. % per element. Particularly the use of niobium, aluminium, and titanium can result in improved mechanical properties. The composition is balanced to 100% predominantly with iron.

To improve mechanical properties, the front face is preferably subjected to a precipitation hardening treatment or age hardening. This can be carried out, e.g., after welding the backside wall to the free baffle top ends. Additionally, particularly if a nickel steel alloy is used comprising carbide forming constituents such as niobium, the front face can be subjected to a solution anneal treatment, e.g. before the precipitation hardening takes place and after welding. The front face can for example be subjected to a solution anneal treatment at 900-1000° C. followed by rapid cooling, e.g., in water, followed by a precipitation hardening treatment at 720° C. for 8 hours, furnace cooling to 620° C. for a total aging time of 18 hours, followed by air cooling. Alternatively, the front face can for example be subjected to a solution anneal treatment at 1000-1150° C. followed by rapid cooling, e.g., in water, followed by a precipitation hardening treatment at 760° C. for 10 hours, furnace cooling to 650° C. for a total aging time of 20 hours, followed by air cooling.

The present invention allows the use of thin-walled structures that can withstand high heat fluxes. The front side wall of the front face can be as thin as 0.5-3 mm. Due to the internal pressure by the coolant during operation, the baffles defining the coolant flow path should have a sufficient tensile strength. Depending on the total length of baffles, the baffle can have a thickness of, e.g., 0.5-3 mm.

The invention further relates to a burner for the partial combustion of a gas carried carbonaceous fuel comprising a front face manufactured according to any one of the methods described above.

BRIEF DESCRIPTION OF THE DRAWINGS

The invention will now be described in more detail, by way of example only, with reference to the accompanying drawings, wherein:

FIG. 2: shows in detail a cross section of the front face of the burner in FIG. 1;

FIG. 3: shows in rear view the front wall with baffles of the front face of FIG. 2.

DETAILED DESCRIPTION OF THE INVENTION

Figure 1:
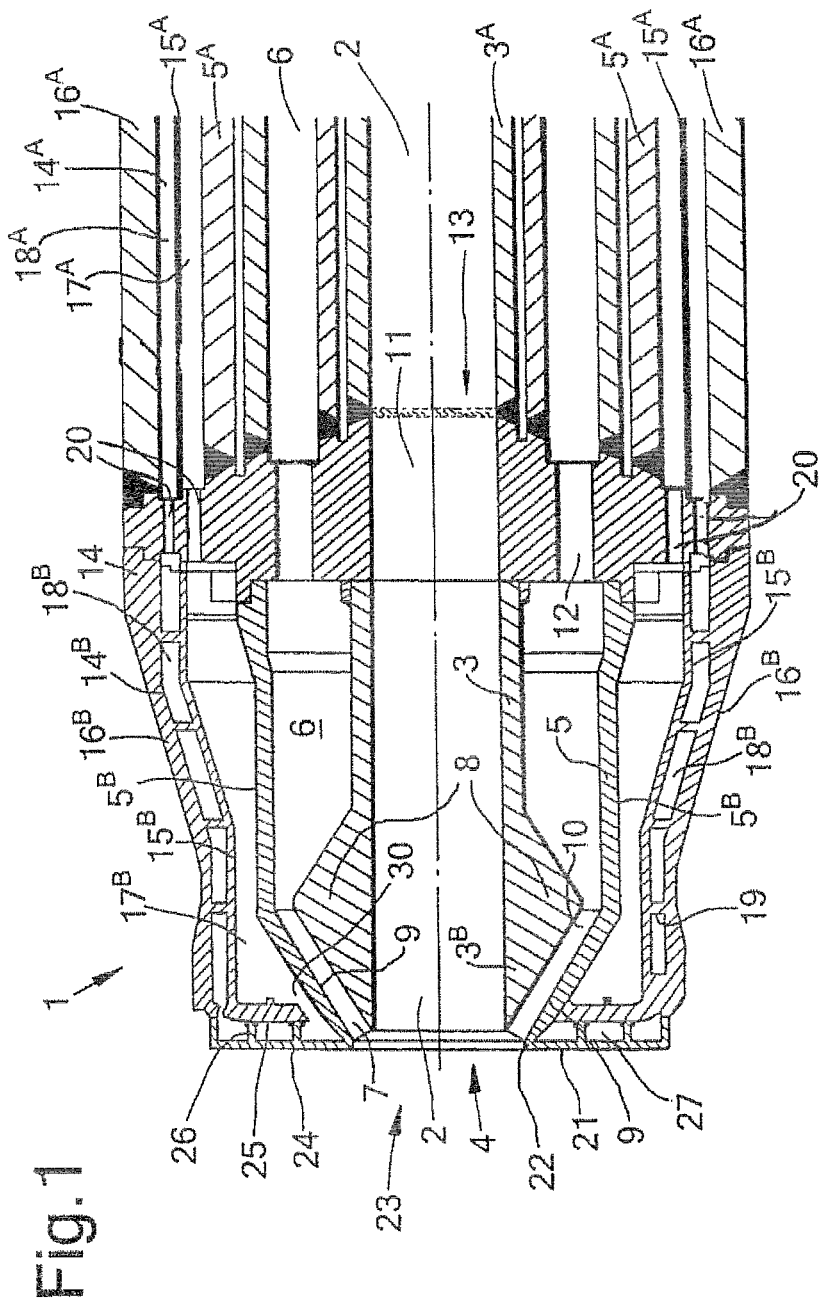
FIG. 1: shows a longitudinal cross section of a burner comprising a front face manufactured according to the invention.

FIG. 1 shows in a longitudinal cross section a cylindrical burner 1 for the partial combustion of a carbonaceous fuel, such as pulverized coal carried on nitrogen or carbon dioxide gas. The burner 1 comprises a cylindrical central channel 2 defined by a cylindrical inner wall 3 disposed along longitudinal axis and having a discharge outlet 4 for supplying the fuel gas to a combustion zone. Concentrically arranged around the inner wall 3 is a cylindrical outer wall 5. In this particular embodiment, the inner and outer wall 3, 5 have double walled upstream parts 3A, 5A and single-walled downstream parts 3B, 5B. The inner and outer wall 3, 5 define an annular coaxial channel 6 for supplying an oxygen containing gas. The coaxial channel 6 has a discharge end 7 converging in the flow direction and forming an outlet for the oxygen-containing gas flow into the combustion zone.

The inner wall 3 has a constant inner diameter. The downstream wall part 3B has a conically expanded part 8 with enlarged outer diameter declining towards the discharge outlet 4 so as to form an annular bulge with—in this particular embodiment—a triangular cross section. The downstream part of outer wall 5B forms a cylinder with a conical end 9 convergent in flow direction. The bulging part 8 of the downstream inner wall part 3B and the conical end 9 of the downstream outer wall part 5B define an annular slit 10 of even width and wherein part 8 has a diameter decreasing in the direction of the discharge outlet 4. This annular slit 10 forms the discharge outlet 7 of the coaxial channel 6.

The inner and outer channel wall parts 3A, 3B, 5A and 5B are welded to a circular connection block 11. The circular connection block 11 is provided with a concentric circular array of openings 12 allowing flow-through from the upstream part of the coaxial channel 6 to the downstream part of it and a central aperture 13 in line with the central channel 2. In between the openings 12, the connection block 11 bridges the inner and outer walls 3, 5.

The coaxial channel 6 is encased by a cooling jacket 14 with an upstream part 14A at the upstream side of the connection block 11 and a downstream part 14B at the downstream part of the connection block 11. Two coaxial casings 15A, 16A are welded to the upstream side of connection block 11 to form two coaxial compartments, inner compartment 17A, and outer compartment 18A.

The downstream part of the cooling jacket 14B comprises an inner jacket wall 15B, forming the downstream extension of upstream inner casing 15A, and an outer jacket wall 16B, forming the downstream extension of upstream casing 16A. The space 18B between the jacket walls 15B, 16B forms the downstream extension of the upstream cooling jacket compartment 18A and is divided by baffles 19 into spiral channels. The space 17B between inner jacket wall 15B and the outer wall part 5B forms the downstream extension of the upstream inner compartment 17A. The connection block 11 is provided with two concentric circular arrays of openings 20 connecting the upstream cooling jacket compartments 17A, 18A with the downstream cooling jacket compartments 17B, 18B respectively.

Downstream the cooling jacket section 14B, a double walled front face 21 is disposed under right angles with the cooling jacket walls 15B, 16B. The front face 21 has an inner edge 22 defining a central opening 23 and adjoining the outer edge of the coaxial channels outer wall 5B. The front face 21 has an outer diameter which is smaller than the outer diameter of the upstream cooling jacket part 14A. In flow direction the downstream cooling jacket part 14B tapers down from the same outer diameter as upstream cooling jacket casing 14A to the outer diameter of the front face 21.

The burner 1 of FIG. 1 is essentially cylindrical. The block 11 is a circular block with a diameter corresponding to the outer diameter of the cooling jacket. The openings 12, 20 form circular arrays which are concentric with the central opening 13.

FIG. 2 shows the front face 21 in a more detailed cross section with the outer tip of the inner wall part 3B defining the discharge end of the central channel 2, which is in line with the central opening 23 of the front face 21. The front face 21 is welded on the outer edge of the conical end 9 defining the annular slit 10. The double walled front face 21 has a downstream front wall 24 and a back side wall 25 spaced by concentric baffles 26 defining concentric flow path sections 27. As shown in FIG. 3, each of the flow path sections 27 is blocked by a partition 28 bridging an inner and an outer baffle 26 just after an interruption 29 in the inner baffle. This way, the baffles 26 define a spiral flow path. This flow path is in open connection with downstream cooling jacket compartment 18B via coolant discharge outlet 31. Near the opening 23 in the front face 21, the coolant flow path between the front and back side wall 24, 25 of the front face 21 is in open connection with the downstream cooling jacket compartment 17B via coolant inlet 30 in the front face back side wall 25.

The upstream inner cooling jacket compartment 17A is connected to a supply of a liquid coolant. The coolant flows from the inner cooling jacket compartment 17A, via openings 20 in block 11, downstream compartment 17B, coolant inlet 30, flow path sections 27 in front face 21, coolant discharge outlet 31, outer cooling jacket compartment 18B, openings 20 in block 11, and outer compartment 18A to a coolant discharge. A circumferential end wall 32 closes off the space between the front wall 24 and the back side wall 25 of the front face 21.

The front side wall 24, the concentric baffles 26 and the circumferential wall 32 are machined out of a single piece of a nickel chromium steel alloy. The backside wall 25 is composed of concentric segments 33 corresponding to the concentric flow path sections defined by the baffles 26. The segments 33 are positioned on top of the free baffle ends, bridging the baffles 26. After that, the back side wall segments 33 are welded to the baffles 26. After welding, the front face 21 is subjected to anneal solution treatment, followed by precipitation hardening.

What is claimed is:

1. A method for manufacturing a front face for protecting a discharge end of a burner with two or more coaxial channels, the front face comprising a central aperture corresponding to the discharge end of the burner, a front side wall and a backside wall spaced by one or more concentric baffles defining a coolant flow path with a first end provided with a coolant inlet and a second end having a coolant discharge outlet wherein the front side wall and the one or more concentric baffles are made of a single piece of metal and wherein the backside wall is welded on free top ends of the one or more concentric baffles, and wherein the burner further comprises a circular connection block, wherein the burner comprises a cylindrical central channel defined by a cylindrical inner wall disposed along a longitudinal axis and having a discharge outlet for supplying a fuel gas to a combustion zone, wherein concentrically arranged around the inner wall is a cylindrical outer wall, the inner and outer wall defining an annular coaxial channel for supplying an oxygen containing gas, the inner and outer wall having inner and outer channel wall parts, wherein the inner channel wall parts are defined by inner wall parts of double walled upstream parts and inner wall parts of single-walled downstream parts; and the outer channel wall parts are defined by outer wall parts of double walled upstream parts and outer wall parts of single-walled downstream parts wherein the inner and outer channel wall parts are welded to the circular connection block, and wherein the double walled upstream parts are arranged on a upstream side of the circular connection block and the single-walled downstream parts are arranged on a downstream side of the circular connection block.

2. The method according to claim 1, wherein three or more concentric baffles define concentric flow path sections at least one of these flow path sections being blocked by a partition bridging an inner and an outer baffle just after an interruption in the inner baffle.

3. The method according to claim 2, wherein the backside wall is built of segments corresponding to the concentric flow path sections.

4. The method according to claim 1, wherein at least the front wall is made of a steel alloy comprising iron and 45-60 wt. % of nickel.

5. The method according to claim 4, wherein the steel further comprises 17-25 wt. % of chromium.

6. The method according to claim 4, wherein the steel comprises 4-6 wt. % of niobium.

7. The method according to claim 4, wherein the steel comprises 2-4 wt. % molybdenum.

8. The method according to claim 4, wherein the steel comprises at least one element of the group of titanium, aluminium, cobalt, carbon, manganese, silicon, phosphorus, sulphur, boron, and copper, in an amount of 0.004-1.3 wt. % per element.

9. The method according to claim 1, wherein the front face is made of a steel alloy comprising iron and 45-60 wt. % nickel; 17-25 wt. % of chromium; 4-6 wt. % of niobium; 2-4 wt. % molybdenum; and at least one element of the group of titanium, aluminium, cobalt, carbon, manganese, silicon, phosphorus, sulphur, boron, and copper, in an amount of 0.004-1.3 wt. % per element.

10. The method according to claim 1, wherein after welding, the front face is subjected to a precipitation hardening treatment.

11. The method according to claim 10, wherein before the precipitation hardening treatment, the front face is subjected to a solution anneal treatment.

12. A burner for the partial combustion of a gas carried carbonaceous fuel comprising a front face manufactured according to claim 1.

* * * * *